Patented Nov. 13, 1951

2,575,155

UNITED STATES PATENT OFFICE 2,575,155

MANUFACTURE OF POLYHYDROXY ANTHRAQUINONE SULFONIC ACIDS

Curt Bamberger, Jersey City, and John W. Orelup, Short Hills, N. J., assignors to Patent Chemicals Incorporated, Paterson, N. J., a corporation of New Jersey No Drawing. Application October 9, 1948, Serial No. 53,753

3 Claims. (Cl. 260—375)

This invention relates to a process for the manufacture of polyhydroxy-anthraquinone sulfonic acids and especially 1.4-dihydroxy-anthraquinone sulfonic acids.

The technically valuable 1.4-dihydroxy anthraquinone-2-sulfonic acids of the general formula

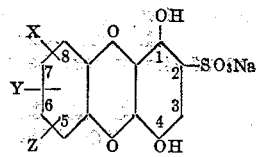

wherein X, Y, Z stands for hydrogen or any substituent such as halogen, the sulfonic acid group, the hydroxy group, or others are obtainable according to the process of German Patent 287,867 by reacting 1.4-dihydroxy-anthraquinone of the general formula:

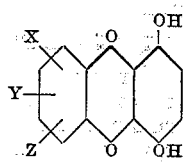

in aqueous medium with sulfites, preferably in the presence of manganese dioxide.

We have now found that by using organic nitro-compounds instead of metal oxides as manganese dioxide, a much improved process is obtained.

Using certain organic nitro-compounds, especially water soluble organic nitro-compounds, the conversion of 1.4-dihydroxy-anthraquinone into the 2-sulfonic acid is complete in 1 to 2 hours heating in an open vessel. This represents an important technical advantage not only in shortening the time required, but also in avoidance of the troublesome separation of the reaction product from water soluble manganese or other metallic salts as for example cupric salts.

Moreover, according to the procedure of the German patent, the reaction product has to be separated from unreacted material. Because of complete conversion of 1.4-dihydroxy-anthraquinone according to the present invention, this separation step is unnecessary.

The present invention comprises reacting 1.4-dihydroxy-anthraquinone with a sulfite in water in the presence of an organic nitro-compound, preferably water soluble, at elevated temperature until a test shows that all the 1.4-dihydroxy-anthraquinone has become water soluble.

The following specific examples will further illustrate the invention, but it is understood that the invention is not limited thereto. The parts are by weight.

Example 1

24 lbs. of sifted 1.4-dihydroxy-anthraquinone
50 lbs. of sodium sulfite
20 lbs. of m-nitrobenzene-sulfonic acid (sodium salt)
750 lbs. of water.

are heated with vigorous stirring to 95° C. and kept between 95° C. and 100° C. After 5 minutes on temperature, 5 lbs. of sodium bicarbonate is added and after a further 10 minutes, 5 lbs. more of sodium bicarbonate is added for the purpose of reducing the alkalinity of the mixture.

A sample taken after about 2 hours, diluted with water and acidified, shows that all 1.4-dihydroxy-anthraquinone has become water soluble. The reaction product separates as a reddish maroon precipitate.

The reaction mixture is then cooled, made strongly acid, whereupon the 1.4-dihydroxy-anthraquinone-2-sulfonic acid or its sodium salt separates in bright orange crystals, which are collected on a filter, washed with brine and dried.

Example 2

24 lbs. of sifted 1.4-dihydroxy-anthraquinone
50 lbs. of sodium sulfite
800 lbs. of water are heated with good agitation to 95° C.
20 lbs. of nitrobenzene are added, whereupon the reaction starts immediately. After 5 minutes at about 95°–100° C., 5 lbs. of sodium bicarbonate is added. After a further 10 minutes, 5 lbs. more of sodium bicarbonate is added.

After about 2 hours at 95°–100° C. an acidified sample shows that all 1.4-dihydroxy-anthraquinone is converted into the water soluble sulfoacid. After the sulfonation is finished, the excess of nitrobenzene is boiled off, the mass cooled to about 60° C. and made strongly acid.

The 1.4-dihydroxy-anthraquinone-2-sulfonic acid separates in crystallized form and is collected on a filter, washed neutral with brine and dried.

It is thus possible to use a non-soluble oxidizing agent such as nitrobenzene but because the water soluble compounds are present in solution and the excess thereof may be separated by filtration rather than by distillation, they are preferred. Furthermore, the fumes of nitrobenzene are toxic.

Example 3

10 lbs. of 1.4.5.6 tetra-hydroxy-anthraquinone
20 lbs. of sodium sulfite
300 lbs. of water are heated with vigorous agitation to 95°–100° C. whereupon 12 lbs. of m-nitrobenzene-sulfo-acid are added. The temperature is then kept between 97° and 100° C.

The reaction mixture becomes more and more blue. After one-half hour, 3 lbs. of sodium bicarbonate are added and after another one-half hour, 3 lbs. more of sodium bicarbonate are added.

After four hours on temperature, the reaction mixture is cooled and worked up similar to Example 1.

The reaction product separates from its clear solution upon salting with 10% salt in the form of brown hairy needles. The reaction product— probably the 1.2.5.8 - tetrahydroxy - anthraquinone-6(and/or 7-)-sulfo-acid gives a blue lake, when precipitated in the usual way with aluminum-hydroxide.

Example 4

30 lbs. of 1.4.5.8-tetra-hydroxy-anthraquinone in form of finely divided paste
2000 lbs. of water
60 lbs. of sodium sulfite and
40 lbs. of m-nitrobenzene-sulfo-acid are heated together to 98°–100° C. and kept there for 6 hours.

The reaction mixture is cooled and poured into an excess of dilute sulfuric acid. After filtering from unreacted starting material, the reaction product is isolated from the filtrate by salting with 15% salt while hot, and then cooling to 50° C. The reaction product separates in the form of fine brown particles, which are filtered off, washed with 15% brine and dried. The product, precipitated in the usual way with aluminum hydroxide gives a bright blue lake.

Instead of 1.4-dihydroxy-anthraquinone, substituted 1.4-dihydroxy-anthraquinone may be used, containing one or more substituents in the 5, 6, 7 or 8 position. 6-chloro-1.4-dihydroxy-anthraquinone for instance, treated according to Example 1 gives a 6-chloro-1.4-dihydroxy-anthraquinone-2-(or 3)-sulfonic acid and 1.4-dihydroxy-anthraquinone-6-sulfo-acid gives the 1.4-dihydroxy-anthraquinone-2.6-disulfo-acid.

Instead of nitrobenzene-sulfonic acid other organic nitro-compounds can be used, for instance, nitro-toluene-sulfonic acid, nitro-naphthalene-sulfonic acid, nitrotoluene and many others.

We claim:

1. The process of preparing 1,4-dihydroxy-anthraquinone-sulfo-acids by reacting in aqueous solution in the temperature range 75° C. to 110° C., sodium sulfite, a nitro-compound of the series, benzol, naphthalene, and a 1,4-dihydroxy-anthraquinone of the following general formula:

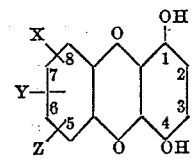

wherein each of X, Y, Z occupies one of the following four ring positions: 5, 6, 7 and 8, and stands for one of the group: hydroxy, halogen, sulfo.

2. The process according to claim 1 in which the nitro-compound in nitrobenzene-sulfonic acid.

3. The process of preparing 1,4-dihydroxy-anthraquinone-2-sulfonic acid which consists in reacting in the temperature range 75° C. to 110° C. 1,4-dihydroxy-anthraquinone with an aqueous solution of sodium sulfite in the presence of a nitro-compound of the series: benzol, naphthalene.

CURT BAMBERGER.
JOHN W. ORELUP.

REFERENCES CITED

The following references are of record in the file of this patent:

UNITED STATES PATENTS

| Number | Name | Date |
|---|---|---|
| 2,443,885 | Bamberger | June 22, 1948 |

FOREIGN PATENTS

| Number | Country | Date |
|---|---|---|
| 287,867 | Germany | Oct. 8, 1915 |
| 288,474 | Germany | Oct. 29, 1915 |
| 289,112 | Germany | Dec. 3, 1915 |

OTHER REFERENCES

Marshall: Jour. Chem. Soc. (London) 1931, pages 3206 to 3208.

Lassar-Cohn: "Arbeitsmethoden fur Organisch, Chemische Laboratorien," Funte Auflage, Spezieller Teil (1923) pages 735–36.